No. 12,316. REISSUED FEB. 7, 1905.
S. TUTTLE.
HOT AIR REGISTER.
APPLICATION FILED DEC. 11, 1903.
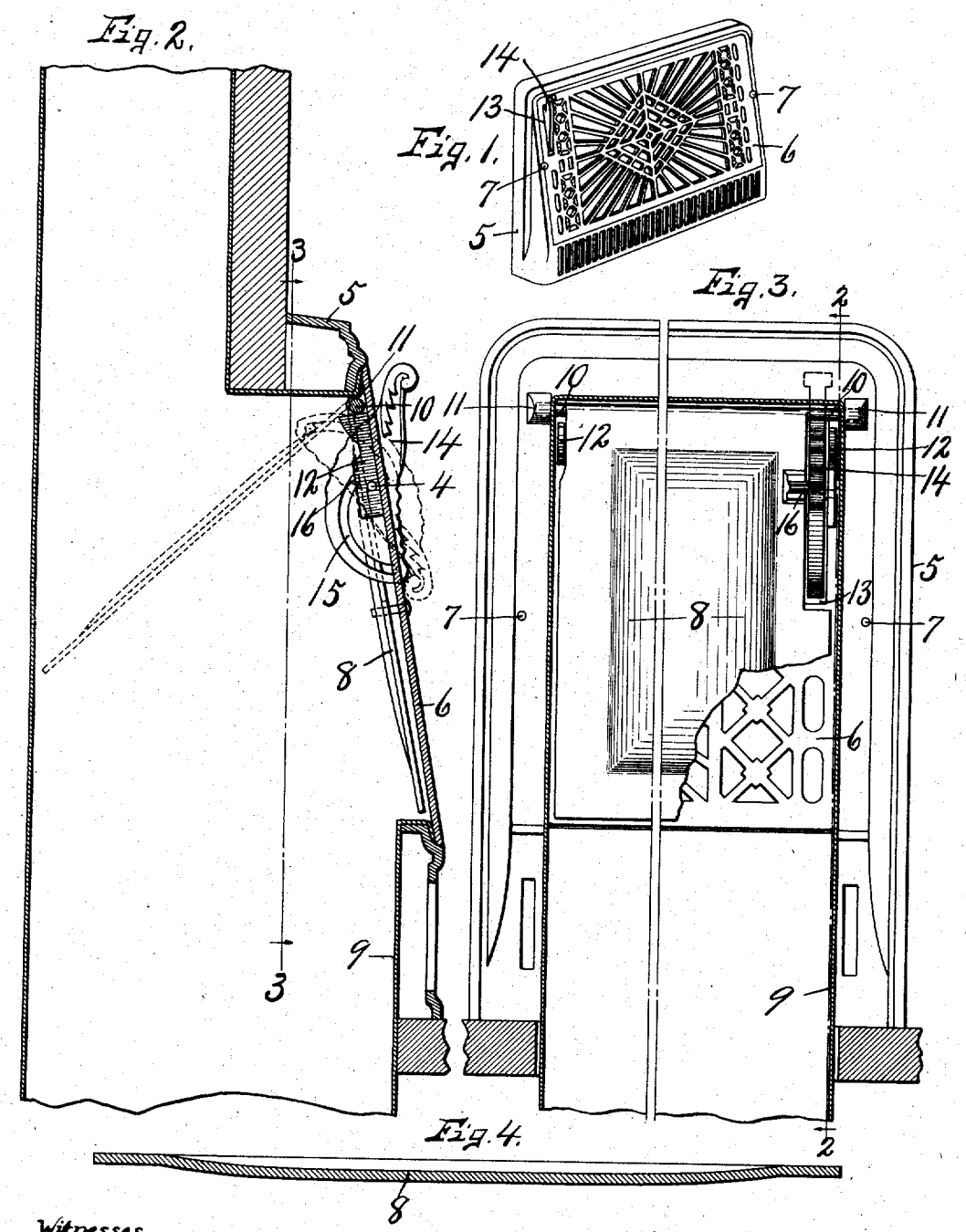
Witnesses.
B. C. Robinson.
H. E. Chase.
Inventor
Silas Tuttle
By
Howard P. Denison
Attorney.

No. 12,316. Reissued February 7, 1905.

UNITED STATES PATENT OFFICE.

SILAS TUTTLE, OF BROOKLYN, NEW YORK, ASSIGNOR TO TUTTLE & BAILEY MANUFACTURING COMPANY, OF BROOKLYN, NEW YORK, A CORPORATION OF NEW YORK.

HOT-AIR REGISTER.

SPECIFICATION forming part of Reissued Letters Patent No. 12,316, dated February 7, 1905.

Original No. 737,976, dated September 1, 1903. Application for reissue filed December 11, 1903. Serial No. 184,838.

*To all whom it may concern:*

Be it known that I, SILAS TUTTLE, of 83 North Tenth street, Brooklyn, in the county of Kings, in the State of New York, have invented new and useful Improvements in Hot-Air Registers, of which the following, taken in connection with the accompanying drawings, is a full, clear, and exact description.

This invention relates to improvements in registers designed to be placed in the side walls of a room for the diffusion of hot air for the purpose of securing an enlarged opening from the lower to the upper room by projecting the register some distance into the room, thus requiring a portion of the floor to be cut out for a larger pipe than can be passed through the ordinary partition, a suitable damper being employed whereby the air may be delivered wholly or partly or not all into either the lower or upper room, as may be desired.

The main object of my present invention is to construct and assemble the parts of the hot-air register in such manner as to avoid as far as possible the use of bolts, screws, or similar clamping devices and still provide a secure and simple connection between the parts to enable the adjustment of the register-frame with reference to the flue to conform to varying thicknesses of lath and plaster between the flue and the register-frame.

A more specific object is to provide a vertically-rocking damper-controlling lever, which is fulcrumed and connected in such manner as to hold the damper in any position.

Other objects will appear in the following description.

In the drawings, Figure 1 is a perspective view of a hot-air register embodying my invention. Fig. 2 is sectional view taken on line 2 2, Fig. 3. Fig. 3 is a sectional view taken on line 3 3, Fig. 2, with a part broken away. Fig. 4 is a sectional view of the damper.

Similar reference characters indicate corresponding parts in all the views.

Referring to the drawings, 5 designates the frame of the register, which is made deeper at the bottom than at the top and incloses the portion of the front of a tin flue 9, having substantially double the capacity below the frame that it has above the frame for a purpose well known. This flue is provided with a branch opening in its front wall, and the portions of the flue surrounding the opening are bent forwardly or outwardly to form a flange upon which the frame 5 is mounted, so as to surround the opening. The bottom of this register-frame 5 rests upon the floor, and the sides and top are placed against the face of the wall into which the flue extends, a portion of the base-board being removed to receive the frame, which latter may be adjusted along the flange of the tin flue surrounding the opening to accommodate itself to varying thicknesses of lath or plaster, and after the frame is properly placed and the flanges of the tin flue which surround the branch opening are brought through the frame the edges of these flanges are suitably trimmed and are then turned over and upon the outer face of the frame, thereby securing the frame to the flue and holding it against the inner face of the wall of the room in which the register is located.

The front upper ends of the side walls of the frame 5 are formed with bearing-sockets 11, having their front sides open, said sockets being located just beneath the front edge of the upper wall or flange of the branch opening for receiving the trunnions of a suitable damper, presently described.

Secured to the front face of the frame 5 is a grille-plate 6, which is held in place by suitable fastening means, as screws 7, and its marginal edges abut against the outturned front edges of the flanges which surround the branch opening, and it is thus apparent that said outturned portions of the flue are clamped between the marginal edges of the grille-plate and outer face of the frame 5. This grille-plate is formed with a vertical slot 13, which is located in the upper part at one side and beneath the swinging axis of the damper for receiving a vertical rocking lever 14. The upper portion of the grille-plate 6 extends across and covers the open sides of the bearing-sockets 11, and it will be apparent from the following description that this serves to hold the damper in operative position, or rather from displacement through the open sides of said sockets. The lever 14 is fulcrumed at 4 upon the grille-plate 6, or rather upon one of a pair of brackets 12, which are secured to and form a part of said grille-plate, the upper end of the lever projecting in front of the plate 6 above the fulcrum, and the lower portion is mainly at the rear of said plate and is provided with an eccentric slot 15, extending downwardly at the rear of the fulcrum 4.

A damper 8 is arranged to swing transversely of the flue to and from the grille-plate 6 and is provided at its upper end with laterally-projecting trunnions 10, which are inserted through the open sides of the bearing-sockets 11 and are normally seated therein, being held in place by the grille-plate 6, as previously described. This damper is formed with a pin 16, projecting from its side edge adjacent to the lever 14 and into the slot 15 at the rear of the fulcrum 4 and below the trunnions 10, so that when the upper end of the lever 14 is rocked forwardly and downwardly the cam-shaped walls of the slot 15 ride against the pin and tilt the damper to the position seen in dotted lines in Fig. 2, the eccentricity of said slot being such that the bearing-point of the pin is always at substantially right angles to its arc of movement, and therefore are nearly radial with reference to the swinging arc of the damper, thereby operating to hold the damper in any of its adjusted positions. In order to facilitate the assembling of the parts, the edge of the damper adjacent to the lever 14 is recessed, so that when the lever is assembled upon its fulcrum on the grille-plate 6 the pin 16 may be readily inserted into the slot 15, and before the grille-plate is placed in position upon the frame 5 the damper is assembled with its pin 16 in said slot and its trunnions 10 resting upon the upper ends of the brackets 12, whereupon the grille-plate, with the damper and lever mounted thereon, are secured in operative position, the trunnions 10 readily entering the open sides of the bearing-sockets 11 to support the damper and take its weight off from the brackets 12. It is thus seen that the only screws or bolts which are employed in assembling the parts of my hot-air register are the screws 7 and that the grille-plate serves to lock the damper in operative position, while the lever is interposed between the pin 16 and adjacent bracket 12, and it therefore cannot move laterally sufficient to disconnect the pin 16 from the lever. I preferably make the damper 8 concavo-convex in cross-section to prevent its distortion by heat.

Having thus described my invention, what I desire to claim is—

1. In a hot-air register, the combination with a hot-air flue having an opening in one of its sides, of a register-frame surrounding the opening, portions of the flue being brought through and turned over and upon the outer face of the frame thus securing the frame to the flue, open-sided bearings on the front upper ends of the frame at opposite sides of the opening, a damper having trunnions inserted through the open sides of the bearings and seated therein to support the damper in the flue-opening, a grille-plate secured to the front of the frame across the flue-opening and covering the open sides of the bearings to hold the trunnions therein, a lever fulcrumed on the plate below the damper-bearings and provided with an eccentric slot at the rear of and extending downwardly from the fulcrum, and a stud or pin on the damper at the rear of the fulcrum of the lever and projecting directly into the eccentric slot.

2. In a hot-air register, the combination of a flue having an opening in its front, a register-frame surrounding the opening, portions of the front of the flue being brought through the frame and turned over and upon the front face of the frame to hold the frame in place, a grille-plate across the opening secured to the front face of the frame, a damper hinged to the upper front portion of the frame and swinging in the opening, and a vertically-rocking lever fulcrumed on the plate and extended downwardly at the rear of said plate and engaged directly with the damper to rock the same and its upper end extending upwardly in front of the plate.

3. In a hot-air register, the combination with a flue having an opening in its front, a register-frame surrounding the opening, a grille-plate across the opening and secured to the frame at the sides of the opening, a flange forming part of the flue surrounding the opening and having its front edges bent laterally and impinged between the frame and grille-plate, a damper hinged at its upper end to the frame and swinging in the opening, and a lever fulcrumed beneath and having its rocking axis parallel with the swinging axis of the damper and engaged with said damper at the rear of the fulcrum to operate the damper and hold it in its adjusted position.

4. In a hot-air register, the combination with an upright flue having a lateral branch, a frame fitting over and surrounding the lateral branch, the front edges of said branch being bent over and upon the front face of the frame, a grille-plate engaged with said overturned edges and secured to the frame, a damper hinged to the frame to swing in the flue and branch, a lever fulcrumed on the grille-plate below the swinging axis of the damper and extended rearwardly and downwardly from the fulcrum and provided with an eccentric slot, and a pin on the damper at the rear of the lever-fulcrum and projecting into said slot.

5. In a hot-air register, in combination, a hot-air flue having an opening in its front, a register-frame surrounding the opening and having bearing-sockets at the sides of the opening, the front sides of the sockets being open, a damper hinged in said sockets, a grille-plate secured to the front of the frame and covering the flue-opening and also the open sides of the sockets, a lever fulcrumed on the grille-plate below the sockets and provided with an eccentric slot, and a pin on the damper projecting into the slot.

6. In a hot-air register, the combination, with a register-frame and a grille-front, of a damper and its operating mechanism both assembled upon the grille-front, the latter being secured to the frame and the frame having open-sided bearings in which the damper is pivotally hung when the grille-front is placed in position.

7. In a register, a frame having socket members forming bearings opening outward, a damper, trunnions on said damper for engaging in said socket members, a front plate secured to the frame and forming outer bearings for the trunnions, and brackets on the inner side of the front plate for supporting the damper when assembling the parts.

8. In a register, a frame having socket members forming bearings, the said socket members opening outward or to the front, a damper, trunnions on said damper to engage in said socket-bearings, a grille-front removably secured to the frame and forming the outer bearings for the trunnions, and brackets on the inner side of said grille-front for supporting the trunnions when assembling the parts.

In witness whereof I have hereunto set my hand this 2d day of December, 1903.

SILAS TUTTLE.

In presence of—

EDWARD VREELAND,
CHARLES C. HICKEY.